US 11,897,019 B2

(12) United States Patent
Albright et al.

(10) Patent No.: US 11,897,019 B2
(45) Date of Patent: *Feb. 13, 2024

(54) CONVERSION PRESS END RETAINING BAR ASSEMBLY (71) Applicant: Stolle Machinery Company, LLC, Centennial, CO (US)

(72) Inventors: Steven Todd Albright, Covington, OH (US); Robert Joseph Will, Maria Stein, OH (US); Dennis Cornelius Stammen, Brookville, OH (US)

(73) Assignee: Stolle Machinery Company, LLC, Centennial, CO (US)

( * ) Notice: Subject to any disclaimer, the term of this patent is extended or adjusted under 35 U.S.C. 154(b) by 721 days.

This patent is subject to a terminal disclaimer.

(21) Appl. No.: 17/129,974

(22) Filed: Dec. 22, 2020

(65) Prior Publication Data
US 2021/0110621 A1    Apr. 15, 2021

Related U.S. Application Data (63) Continuation of application No. 10/273,507, filed on Oct. 18, 2002, now abandoned.

(51) Int. Cl.
*B21D 43/00*    (2006.01)
*B21D 51/44*    (2006.01)
(Continued)

(52) U.S. Cl.
CPC .......... *B21D 43/003* (2013.01); *B21D 51/44* (2013.01); *B67B 3/22* (2013.01); *G07C 5/085* (2013.01);
(Continued)

(58) Field of Classification Search
CPC .... B21D 51/26; B21D 51/38; B21D 51/2692; B21D 43/12; B21D 51/44; B21D 51/446; B21D 51/383; B65G 45/16; B65G 43/003
(Continued)

(56) References Cited

U.S. PATENT DOCUMENTS 4,213,324 A * 7/1980 Kelley ................. B21D 51/383
413/15
4,546,873 A * 10/1985 Debenham ........... B21D 43/023
198/836.2
(Continued)

FOREIGN PATENT DOCUMENTS

CN    205574867 U    9/2016

OTHER PUBLICATIONS

Slac Precision Equipment Ltd. Hexadtm Conversion System, Company News, http://slac.com.cn/en/newsshow.asp?id=6, Sep. 14, 2018, 3 pages.
(Continued)

*Primary Examiner* — Bobby Yeonjin Kim
(74) *Attorney, Agent, or Firm* — Eckert Seamans Cherin & Mellott, LLC (57) ABSTRACT

A retainer assembly includes a retaining member assembly and a motion assembly. The retaining member assembly is structured to selectively retain at least one shell in a transfer belt assembly belt recess. The retaining member assembly includes a retaining member. The motion assembly is structured to move the retaining member between a first position, wherein the retaining member is spaced from the transfer belt assembly transfer belt, and, a second position, wherein the retaining member is disposed a retaining distance from the transfer belt assembly transfer belt.

20 Claims, 8 Drawing Sheets (51) Int. Cl.
*B67B 3/22* (2006.01)
*G07C 5/08* (2006.01)
*H04N 5/76* (2006.01)
*H04N 5/781* (2006.01)
*H04N 5/85* (2006.01)
*H04N 9/804* (2006.01)

(52) U.S. Cl.
CPC ............. *G07C 5/0891* (2013.01); *H04N 5/76* (2013.01); *H04N 5/781* (2013.01); *H04N 5/85* (2013.01); *H04N 9/8042* (2013.01)

(58) Field of Classification Search
USPC ................. 413/3, 56, 70, 66, 67, 14, 15, 16; 198/867.11, 867.12, 803.13, 803.14
See application file for complete search history.

(56) References Cited

U.S. PATENT DOCUMENTS

| | | | | |
|---|---|---|---|---|
| 4,799,846 A * | 1/1989 | Wissman | ............. | B21D 51/383 413/66 |
| 4,822,232 A * | 4/1989 | Gantz | ................. | B21D 51/383 198/803.15 |
| RE33,061 E * | 9/1989 | Brown | ................. | B21D 51/383 413/66 |
| 5,182,934 A * | 2/1993 | Herdzina | ............. | B21D 51/383 72/405.13 |
| 6,405,853 B1 | 6/2002 | Cook et al. | | |
| 9,321,097 B2 * | 4/2016 | Butcher | ................. | B21D 51/383 |
| 2003/0015507 A1 * | 1/2003 | Miller | .................... | B23K 26/08 219/121.68 |
| 2003/0053890 A1 * | 3/2003 | Turner | ................. | B21D 51/383 413/14 |
| 2007/0166131 A1 * | 7/2007 | Cook | .................. | B21D 51/383 413/52 |
| 2016/0030996 A1 * | 2/2016 | Butcher | ................. | B21D 51/38 413/66 |

OTHER PUBLICATIONS

SLAC Hexad Conversion System—SLAC Products and Solutions, http://dev.slacdayton.com/Products-And-Solutions/post/slac-hexad-conversion-system, Sep. 19, 2018, 3 pages.
CN National Intellectual Property Administration, CN Patent Application No. 201980091766.6, first Office Action, 10 pages, dated Nov. 22, 2022 and English translation attached.

\* cited by examiner

CONVERSION PRESS END RETAINING BAR ASSEMBLY

CROSS REFERENCE TO RELATED APPLICATION

This application is a continuation application of and claims priority to U.S. patent application Ser. No. 16/273,507, filed Feb. 12, 2019 entitled, CONVERSION PRESS END RETAINING BAR ASSEMBLY.

BACKGROUND OF THE INVENTION

Field of the Invention

The disclosed and claimed concept relates to a conversion press and, more specifically, to a retainer assembly for a conversion press transfer belt assembly.

Background Information

Metallic containers (e.g., cans) for holding products such as, for example, food and beverages, are typically provided with an easy open can end on which a pull tab is attached (e.g., without limitation, riveted) to a tear strip or severable panel. The severable panel is defined by a scoreline in the exterior surface (e.g., public side) of the can end. The pull tab is structured to be lifted and/or pulled to sever the scoreline and deflect and/or remove the severable panel, thereby creating an opening for dispensing the contents of the can. Hereinafter, a twelve ounce beverage can will be used as an example. It is understood, however, that the disclosed and claimed concept is not limited to twelve ounce beverage cans.

As used herein, a "can end" consists of a "shell" and "tab." As used herein, a "shell" is the portion of a "can end" that is structured to be, and is, coupled to a "can body" wherein the "can body" defines a generally enclosed space. The "tab" is the construct coupled to the shell and which is structured to be, and is, lifted and/or pivoted relative to the shell at a location adjacent a scoreline whereby the scoreline is severed creating an opening for dispensing the contents of the can.

In an exemplary embodiment, the shell and the tab are made in separate presses. The shell is created by cutting out and forming a blank from a coil of sheet metal product (e.g., without limitation, sheet aluminum; sheet steel). For the exemplary beverage can shell, the blank is generally planar and generally circular. For such a beverage can shell, the shell press forms an annular countersink adjacent the periphery of the blank as well as a seaming panel that is structured to be, and is, coupled to a can body. In one exemplary embodiment, additional constructs associated with a beverage can shell such as, but not limited to, a scoreline defining a deflectable tear panel, are also formed in the shell press. In another exemplary embodiment, the additional constructs are formed in the conversion press, discussed below. Further, the tabs are typically formed in the conversion press immediately prior to staking, i.e., coupling, the tabs to the shells.

Generally, the shell press, and the conversion press, include a ram press and a tooling assembly with a movable upper tooling and a stationary lower tooling. That is, as used herein, the "ram press" is an assembly that is being identified as a component of the conversion press as opposed to the other way around. This is because a ram press is typically sold as a complete unit to which the tooling and other components are added so as to form the shell/conversion press.

In addition to the ram press, a shell press and/or conversion press includes a housing or frame assembly, a tooling assembly and a number of die sets. The tooling assembly includes a number of upper tooling assemblies and number of lower tooling assemblies. As is known, a ram press includes an elongated ram body through which force is transferred. The upper tooling assemblies are coupled to, and operatively engaged by, the ram body. The upper and lower tooling assemblies include a number of mounting devices to which a plurality of dies are coupled. These mounting devices are hereinafter identified as a "die shoe." Thus, the upper tooling assembly moves between a spaced, upper position, wherein the upper tooling assembly (and therefore the upper die shoe and dies) is spaced from the lower tooling assembly (and therefore the lower die shoe and dies), and, a lower/forming, second position, wherein the upper tooling assembly is a forming distance from the lower tooling assemblies whereby the dies contact and form the blanks. The reciprocal motion wherein the upper tooling assembly moves from the first position to the second position and then returns to the first position is, as used herein, a "cycle."

In a shell press, each die shoe supports shell die set (and in a conversion press a die shoe supports a shell die set and/or a tab die set). As used herein, a "die set" means a plurality of dies that are structured to be, and are, disposed in series wherein each die forms a portion of the shell, or tab, when the upper tooling assembly is in the second position. As used herein, each "die set" inherently includes "upper dies" and "lower dies." Thus, following an introduction of a "die set" it is understood that there are inherently "die set upper dies" and "die set lower dies." Thus, as used herein, following an introduction of a "die set," the "die set upper dies" and "die set lower dies" do not have to be specifically introduced as they are inherently introduced as part of the "die set." A die set forms a "lane" through which blanks/shells travel. That is, as used herein, a "lane" is a path defined by a die set through which a shell moves as it is being formed. In a conversion press there is one "die set" for the tabs and a plurality of "die sets" for the shells. Further, the shell die sets are substantially similar to each other. That is, in an exemplary embodiment, each die set includes substantially similar dies that are disposed in the same sequence. Thus, as the blanks/shells move through the conversion press, each "lane" forms one shell into a substantially similar "can end."

Each shell die set is structured to and does, perform a number of forming operations on the blank/shell. In an exemplary embodiment, an individual die performs one forming operation on the blank/shell. It is understood that each upper die has an associated lower die whereby the upper die and lower die operate cooperatively to accomplish the forming operation. In this configuration, each die is identified as a "station." As used herein, a "station" is a location on the tooling and/or the lane that includes a forming die, or, which is a location for an "idle" station. An "idle" station is a location without a die or wherein no forming operations occur.

Further, the blanks are "indexed" through the tooling assembly. As used herein, to "index" means that the blank or a strip of metal is moved intermittently through the tooling assembly a predetermined/set distance during each cycle of the ram press/tooling assembly. As is generally known, as the upper tooling is moving from the second position to the first position, the blanks/shells are moving between stations. In some presses, the blanks/shells are also moving as the upper tooling moves toward the second position. Before the upper tooling moves fully into the forming, second position, and while the upper tooling is in the forming, second position, the blanks/shells stop moving at a "station." Thus, as the blanks move through the tooling assembly, the blanks/shells are progressively formed into shells.

The tabs are formed in a similar manner but are generally formed directly in a sheet of metal. That is, the tabs are not initially cut into separate blanks that are individually formed. Instead, tabs are produced by feeding in a continuous sheet of metal through a tab die and the tabs are substantially formed while coupled to the sheet. The tab die set forms one row of tabs in the strip for each shell lane. That is, if there are three shell lanes, the tab die forms three rows of tabs. As used herein, a "row" of tabs is a series of tabs extending along a line generally parallel to the longitudinal axis of the strip of material from which the tabs are formed (hereinafter, "tab strip"). The final formation step typically couples the tab to a shell while cutting the tab from the sheet. In an exemplary embodiment, the tab tooling assembly is directly adjacent and/or is part of the conversion press.

The shells, and in some embodiments the tabs, are conveyed to a conversion press. As used herein, a "conversion press" is an assembly including a ram press and number of die assemblies or die sets and which is structured to couple a tab to a shell thereby creating a can end. The number of forming operations performed on the shell by the shell press affects the number of forming operations performed on the shell by the conversion press. That is, either the shell press or the conversion press is, or can be, structured to perform certain operations such as, but not limited to, creating a score for a tear panel. In an exemplary embodiment, the conversion press stations form the paneling, score and integrated rivet on the shell. The rivet on the shell is the element/formation to which the tab is coupled. It is, however, understood that in another embodiment, the rivet is formed in the shell press. Thus, in general, at the conversion press, the blank/shell is fed onto a transfer belt which indexes through an elongated, die set defining a number of lanes.

That is, a downstacker feeds individual shells onto a transfer belt having cavities or recesses sized to accommodate a single shell. In an exemplary embodiment, the transfer belt includes a number of "columns" of recesses. Thus, as used herein, a "column" of recesses means a series of recesses wherein the center of each recess in the "column" is disposed substantially along a line extending substantially parallel to the longitudinal axis of the transfer belt. In an exemplary embodiment, each transfer belt includes two columns of recesses.

At the same time the shells are moving through the conversion press, the tabs are also being formed, either in a press adjacent the conversion press or in the conversion press, and are moved generally perpendicular to the direction of motion of the shells. Stated alternately, the longitudinal axes of the tab die rows are disposed generally perpendicular to the longitudinal axes of the shell dies lanes. As noted above, the tabs are formed from a strip of generally planar sheet material. The tab strip extends through the tab die and, as such, extends generally perpendicular to the longitudinal axis of the transfer belts. Moreover, the tab strip extends over the transfer belts and the shells therein. This configuration is notable as discussed in detail below.

Generally, conversion presses included three single shell lanes or two double shell lanes. Thus, during each cycle of the ram press, the conversion press produced either three or four can ends. Such conversion presses are identified as a "three-out" or "four-out" conversion press. It is desirable to increase the number of can ends produced by a conversion press. This is accomplished by increasing the speed of the conversion press and/or increasing the number of shell lanes on the conversion press. To this end, "six-out" conversion presses, i.e., a conversion press with six shell lanes, have been introduced. Some of the six-out conversion presses operate at a higher speed than known conversion presses.

As noted above, the tab die forms tabs in rows in the strip of material. Thus, the tab strip is sufficiently wide enough to accommodate the appropriate number of rows of tabs. That is, for a three-out conversion press, the tab strip was wide enough to form three rows of tabs and for a four-out conversion press, the tab strip was wide enough to form four rows of tabs. The tabs are configured to be manipulated by human fingers and have a width of about ⅝ inch. Thus, a tab strip for a three-out conversion press was about 2.542 inches wide and tab strip for a four-out conversion press was about 3.336 inches wide. Further, for a beverage can, the shell is about 2 1/16 inches in diameter. The columns of recesses on the transfer belts are disposed about 2.5 inch apart (measured centerline to centerline). Further, the recesses of the transfer belt are slightly offset longitudinally. That is, a line extending generally perpendicular to the longitudinal axis of a transfer belt does not cross the center of more than one shell/recess.

Figure 1:
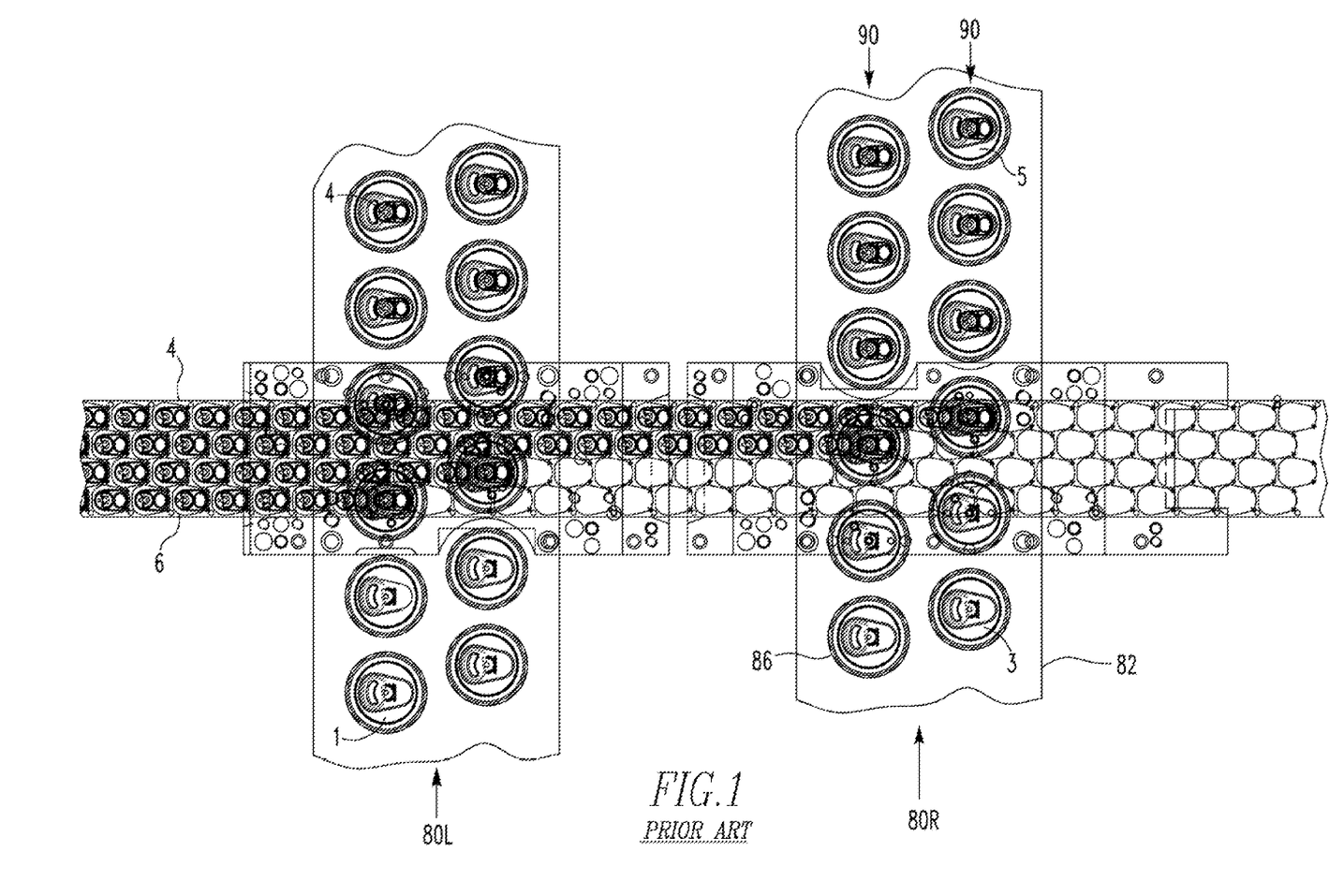
FIG. 1 is a schematic top view of a four-out conversion press staking station and adjacent stations.

These dimensions are notable due the configuration of the transfer belt columns and the tab strip rows discussed above. That is, Figure shows an exemplary configuration of a tab strip 6 and two transfer belts 80, described below, at the time an upper tooling assembly is in the second position, i.e., when a tab 4 is being coupled, or "staked," to a shell 3. As shown, a tab strip 6 extends generally perpendicularly over transfer belts 80 (two shown). The intersection of the tab strip 6 and a transfer belt 80 is, as used herein, a "crossover." Given the width of the tab strip 6, the width of a transfer belt 80, the diameter of the shells 3, and the offset configuration of the recesses 86, described below, as a tab 4 is being staked, the tab strip 6 partially covers a cluster of four shells 3/recesses 86. As shown, the tabs are staked at the lower two recesses 86 on the left transfer belt 80L and at the upper two recesses 86 on the transfer belt 80R on the right. As can be seen, the tab strip 6 partially covers the subsequent (upstream) shells 3/recesses 86 of the left transfer belt 80L and the prior (downstream) shells 3/recesses 86 of the right transfer belt 80R. These locations are, as used herein, the "covered stations." In this configuration, the four covered stations are idle stations. That is, because the tab strip is in the way, it is impossible for a die to perform forming operations on most areas of the shells 3 in the covered stations. As no forming operation occur at an idle station, there are no dies acting upon the shells 3 at the covered station. Due to vibrations and other forces created during forming operations, the shells 3 at the idle stations, if not retained, would be able to shift or become askew in the recesses 86.

Because of this, the tooling assemblies typically included retaining pins at the covered stations. The retaining pins moved with the upper tooling assemblies and engaged the shells 3 at the covered stations as tabs 4 were being coupled to the shells 3 at the adjacent stations. That is, the retaining pins moved to engage the shells 3 at the idle stations as the upper tooling assembly moved from the first position to the second position. When the upper tooling assembly was in the second position, the retaining pins fully engaged the shells 3 at the idle stations and maintained the shells 3 within the recesses 86. This is possible because the tab strip 6 only partially covered a 2×2 cluster of shells 3/recesses 86. That is, if a shell 3/recess 86 was fully covered by the tab strip 6, then the retaining pin could not contact the shell 3. Thus, with a tab strip sized to accommodate four rows of tabs 4, the shell 3 at an idle station adjacent a staking station is partially accessible and is engaged by a retaining pin.

For a six-out conversion press, the tab strip must have a sufficient width to accommodate six rows of tabs. A six row tab strip has a width that covers more than a 2×2 cluster of shells 3/recesses 86. In this configuration, shells disposed near the middle of the tab strip 6 are wholly covered. Thus, retaining pins cannot access the shells 3 at the idle stations adjacent the staking stations. This is problem. That is, if the shells 3 are not retained, the shells 3 may shift or become askew in the recesses 86 due to vibration and other forces created during the forming process. This is a problem.

There is, therefore, a need for a retainer assembly in a six-out conversion press wherein the retainer assembly is structured to maintain shells within the recesses of a transfer belt at the crossover. There is a further need for a retainer assembly that is operative with existing conversion press elements.

SUMMARY OF THE INVENTION

These needs, and others, are met by at least one embodiment of the disclosed and claimed concept which provides a retainer assembly including a retaining member assembly and a motion assembly. The retaining member assembly is structured to selectively retain at least one shell in a transfer belt assembly belt recess. The retaining member assembly includes a retaining member. The motion assembly is structured to move the retaining member between a first position wherein the retaining member is spaced from the transfer belt assembly transfer belt, and, a second position, wherein the retaining member is disposed a retaining distance from the transfer belt assembly transfer belt.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

It will be appreciated that the specific elements illustrated in the figures herein and described in the following specification are simply exemplary embodiments of the disclosed concept, which are provided as non-limiting examples solely for the purpose of illustration. Therefore, specific dimensions, orientations, assembly, number of components used, embodiment configurations and other physical characteristics related to the embodiments disclosed herein are not to be considered limiting on the scope of the disclosed concept.

Directional phrases used herein, such as, for example, clockwise, counterclockwise, left, right, top, bottom, upwards, downwards and derivatives thereof, relate to the orientation of the elements shown in the drawings and are not limiting upon the claims unless expressly recited therein.

As used herein, the singular form of "a," "an," and "the" include plural references unless the context clearly dictates otherwise.

As used herein, "structured to [verb]" means that the identified element or assembly has a structure that is shaped, sized, disposed, coupled and/or configured to perform the identified verb. For example, a member that is "structured to move" is movably coupled to another element and includes elements that cause the member to move or the member is otherwise configured to move in response to other elements or assemblies. As such, as used herein, "structured to [verb]" recites structure and not function. Further, as used herein, "structured to [verb]" means that the identified element or assembly is intended to, and is designed to, perform the identified verb. Thus, an element that is merely capable of performing the identified verb but which is not intended to, and is not designed to, perform the identified verb is not "structured to [verb]."

As used herein, "associated" means that the elements are part of the same assembly and/or operate together, or, act upon/with each other in some manner. For example, an automobile has four tires and four hub caps. While all the elements are coupled as part of the automobile, it is understood that each hubcap is "associated" with a specific tire.

As used herein, a "coupling assembly" includes two or more couplings or coupling components. The components of a coupling or coupling assembly are generally not part of the same element or other component. As such, the components of a "coupling assembly" may not be described at the same time in the following description.

As used herein, a "coupling" or "coupling component(s)" is one or more component(s) of a coupling assembly. That is, a coupling assembly includes at least two components that are structured to be coupled together. It is understood that the components of a coupling assembly are compatible with each other. For example, in a coupling assembly, if one coupling component is a snap socket, the other coupling component is a snap plug, or, if one coupling component is a bolt, then the other coupling component is a nut or threaded bore. Further, a passage in an element is part of the "coupling" or "coupling component(s)." For example, in an assembly of two wooden boards coupled together by a nut and a bolt extending through passages in both boards, the nut, the bolt and the two passages are each a "coupling" or "coupling component."

As used herein, a "fastener" is a separate component structured to couple two or more elements. Thus, for example, a bolt is a "fastener" but a tongue-and-groove coupling is not a "fastener." That is, the tongue-and-groove elements are part of the elements being coupled and are not a separate component.

As used herein, the statement that two or more parts or components are "coupled" shall mean that the parts are joined or operate together either directly or indirectly, i.e., through one or more intermediate parts or components, so long as a link occurs. As used herein, "directly coupled"

means that two elements are directly in contact with each other. As used herein, "fixedly coupled" or "fixed" means that two components are coupled so as to move as one while maintaining a constant orientation relative to each other. As used herein, "adjustably fixed" means that two components are coupled so as to move as one while maintaining a constant general orientation or position relative to each other while being able to move in a limited range or about a single axis. For example, a doorknob is "adjustably fixed" to a door in that the doorknob is rotatable, but generally the doorknob remains in a single position relative to the door. Further, a cartridge (nib and ink reservoir) in a retractable pen is "adjustably fixed" relative to the housing in that the cartridge moves between a retracted and extended position, but generally maintains its orientation relative to the housing. Accordingly, when two elements are coupled, all portions of those elements are coupled. A description, however, of a specific portion of a first element being coupled to a second element, e.g., an axle first end being coupled to a first wheel, means that the specific portion of the first element is disposed closer to the second element than the other portions thereof. Further, an object resting on another object held in place only by gravity is not "coupled" to the lower object unless the upper object is otherwise maintained substantially in place. That is, for example, a book on a table is not coupled thereto, but a book glued to a table is coupled thereto.

As used herein, the phrase "removably coupled" or "temporarily coupled" means that one component is coupled with another component in an essentially temporary manner. That is, the two components are coupled in such a way that the joining or separation of the components is easy and would not damage the components. For example, two components secured to each other with a limited number of readily accessible fasteners, i.e., fasteners that are not difficult to access, are "removably coupled" whereas two components that are welded together or joined by difficult to access fasteners are not "removably coupled." A "difficult to access fastener" is one that requires the removal of one or more other components prior to accessing the fastener wherein the "other component" is not an access device such as, but not limited to, a door.

As used herein, "operatively coupled" means that a number of elements or assemblies, each of which is movable between a first position and a second position, or a first configuration and a second configuration, are coupled so that as the first element moves from one position/configuration to the other, the second element moves between positions/configurations as well. It is noted that a first element may be "operatively coupled" to another without the opposite being true.

As used herein, "functionally coupled" means that a number of elements or assemblies are coupled together so that a characteristic and/or function of one element/assembly is communicated or useable by the other element/assembly. For example, a characteristic of an extension cord is the ability to communicate electricity. When two extension cords are "functionally coupled," the two extension cords are coupled so that electricity is communicable through both extension cords. As another example, two wireless routers, which have the characteristic of communication data are "functionally coupled" when the two routers are in communication with each other (but not physically coupled to each other) so that data is communicable through both routers.

As used herein, the statement that two or more parts or components "engage" one another means that the elements exert a force or bias against one another either directly or through one or more intermediate elements or components. Further, as used herein with regard to moving parts, a moving part may "engage" another element during the motion from one position to another and/or may "engage" another element once in the described position. Thus, it is understood that the statements, "when element A moves to element A first position, element A engages element B," and "when element A is in element A first position, element A engages element B" are equivalent statements and mean that element A either engages element B while moving to element A first position and/or element A either engages element B while in element A first position.

As used herein, "operatively engage" means "engage and move." That is, "operatively engage" when used in relation to a first component that is structured to move a movable or rotatable second component means that the first component applies a force sufficient to cause the second component to move. For example, a screwdriver may be placed into contact with a screw. When no force is applied to the screwdriver, the screwdriver is merely "temporarily coupled" to the screw. If an axial force is applied to the screwdriver, the screwdriver is pressed against the screw and "engages" the screw. However, when a rotational force is applied to the screwdriver, the screwdriver "operatively engages" the screw and causes the screw to rotate. Further, with electronic components, "operatively engage" means that one component controls another component by a control signal or current.

As used herein, "temporarily disposed" means that a first element(s) or assembly (ies) is resting on a second element(s) or assembly(ies) in a manner that allows the first element/assembly to be moved without having to decouple or otherwise manipulate the first element. For example, a book simply resting on a table, i.e., the book is not glued or fastened to the table, is "temporarily disposed" on the table.

As used herein, "correspond" indicates that two structural components are sized and shaped to be similar to each other and may be coupled with a minimum amount of friction. Thus, an opening which "corresponds" to a member is sized slightly larger than the member so that the member may pass through the opening with a minimum amount of friction. This definition is modified if the two components are to fit "snugly" together. In that situation, the difference between the size of the components is even smaller whereby the amount of friction increases. If the element defining the opening and/or the component inserted into the opening are made from a deformable or compressible material, the opening may even be slightly smaller than the component being inserted into the opening. With regard to surfaces, shapes, and lines, two, or more, "corresponding" surfaces, shapes, or lines have generally the same size, shape, and contours.

As used herein, a "path of travel" or "path," when used in association with an element that moves, includes the space an element moves through when in motion. As such, any element that moves inherently has a "path of travel" or "path." Further, a "path of travel" or "path" relates to a motion of one identifiable construct as a whole relative to another object. For example, assuming a perfectly smooth road, a rotating wheel (an identifiable construct) on an automobile generally does not move relative to the body (another object) of the automobile. That is, the wheel, as a whole, does not change its position relative to, for example, the adjacent fender. Thus, a rotating wheel does not have a "path of travel" or "path" relative to the body of the automobile. Conversely, the air inlet valve on that wheel (an identifiable construct) does have a "path of travel" or "path"

relative to the body of the automobile. That is, while the wheel rotates and is in motion, the air inlet valve, as a whole, moves relative to the body of the automobile.

As used herein, the word "unitary" means a component that is created as a single piece or unit. That is, a component that includes pieces that are created separately and then coupled together as a unit is not a "unitary" component or body.

As used herein, the term "number" shall mean one or an integer greater than one (i.e., a plurality). That is, for example, the phrase "a number of elements" means one element or a plurality of elements. It is specifically noted that the term "a 'number' of [X]" includes a single [X].

As used herein, in the phrase "[x] moves between its first position and second position," or, "[y] is structured to move [x] between its first position and second position," "[x]" is the name of an element or assembly. Further, when [x] is an element or assembly that moves between a number of positions, the pronoun "its" means "[x]," i.e., the named element or assembly that precedes the pronoun "its."

As used herein, a "radial side/surface" for a circular or cylindrical body is a side/surface that extends about, or encircles, the center thereof or a height line passing through the center thereof. As used herein, an "axial side/surface" for a circular or cylindrical body is a side that extends in a plane extending generally perpendicular to a height line passing through the center of the cylinder. That is, generally, for a cylindrical soup can, the "radial side/surface" is the generally circular sidewall and the "axial side(s)/surface(s)" are the top and bottom of the soup can. Further, as used herein, "radially extending" means extending in a radial direction or along a radial line. That is, for example, a "radially extending" line extends from the center of the circle or cylinder toward the radial side/surface. Further, as used herein. "axially extending" means extending in the axial direction or along an axial line. That is, for example, an "axially extending" line extends from the bottom of a cylinder toward the top of the cylinder and substantially parallel to a central longitudinal axis of the cylinder.

As used herein, "generally curvilinear" includes elements having multiple curved portions, combinations of curved portions and planar portions, and a plurality of planar portions or segments disposed at angles relative to each other thereby forming a curve.

As used herein, a "planar body" or "planar member" is a generally thin element including opposed, wide, generally parallel surfaces, i.e., the planar surfaces of the planar member, as well as a thinner edge surface extending between the wide parallel surfaces. That is, as used herein, it is inherent that a "planar" element has two opposed planar surfaces. The perimeter, and therefore the edge surface, may include generally straight portions, e.g., as on a rectangular planar member, or be curved, as on a disk, or have any other shape.

As used herein, for any adjacent ranges that share a limit, e.g., 0%-5% and 5%-10, or, 0.05 inch-0.10 inch and 0.001 inch-0.05 inch, the upper limit of the lower range, i.e., 5% and 0.05 inch in the lower range of the examples above, means slightly less than the identified limit. That is, in the example above, the range 0%-5% means 0%-4.999999% and the range 0.001 inch-0.05 inch means 0.001 inch-0.04999999 inch.

As used herein, "upwardly depending" means an element that extends upwardly and generally perpendicular from another element.

As employed herein, the terms "can" and "container" are used substantially interchangeably to refer to any known or suitable container, which is structured to contain a substance (e.g., without limitation, liquid; food; any other suitable substance), and expressly includes, but is not limited to, beverage cans, such as beer and beverage cans, as well as food cans.

As used herein, a "can body" includes a base and a depending, or upwardly depending, sidewall. The "can body" is unitary. In this configuration, the "can body" defines a generally enclosed space. Thus, the "can body," i.e., the base and sidewall, also include(s) an outer surface and an inner surface. That is, for example, a "can body" includes a sidewall inner surface and a sidewall outer surface.

As used herein, to "form" metal means to change the shape of a metal construct.

As used herein, a "forming distance" is a distance between two dies that is sufficiently narrow that at least a portion of the die(s) contacts and forms the material between the dies.

As used herein, "about" in a phrase such as "disposed about [an element, point or axis]" or "extend about [an element, point or axis]" or "[X] degrees about an [an element, point or axis]," means encircle, extend around, or measured around. When used in reference to a measurement or in a similar manner, "about" means "approximately," i.e., in an approximate range relevant to the measurement as would be understood by one of ordinary skill in the art.

As used herein, an "elongated" element inherently includes a longitudinal axis and/or longitudinal line extending in the direction of the elongation.

As used herein, "generally" means "in a general manner" relevant to the term being modified as would be understood by one of ordinary skill in the art.

As used herein, "substantially" means "for the most part" relevant to the term being modified as would be understood by one of ordinary skill in the art.

As used herein, "at" means on and/or near relevant to the term being modified as would be understood by one of ordinary skill in the art.

As used herein, "a line of action substantially aligned with the longitudinal axis" means that the line of force and the longitudinal axis are substantially co-extensive.

As described below, blanks 1, shells 3, and/or a tab strip 6 move through lanes 34 in a conversion press 10, described below. As used herein, the location whereat the blanks 1, shells 3, and/or a tab strip 6 enter the conversion press 10 is the "upstream" end of a lane. Conversely, the "downstream" end is where the can ends 5 or the scrap from the tab strip 6 exit the lane.

As used herein, a "beverage" can/container means a container structured to contain a beverage such as beer or carbonated beverages, i.e., a "soda" or "pop." As is known, some such containers are known to contain about 12 ounces of liquid, but other, similar volumes are known as well. Such containers are structured to be held in a human hand and contain one or two servings. Thus, a gallon container for milk or a coffee samovar, while containing beverages, are not, as used herein. "beverage" containers. Further, "beverage" is used as an adjective; thus, for example, a "beverage" can conversion press means a conversion press structured to make can ends for a "beverage" can.

As used herein, a "six-out conversion press" means a conversion press including a single tab strip having a width sufficient to accommodate six rows of tabs.

As used herein, a "2×2 cluster" of shells and/or shell recesses in a transfer belt means an area having a length and a width wherein the length is defined by the most upstream edge and the most downstream edge of the shells/shell recesses in a transfer belt wherein the centers of the shells/shell recesses are disposed in a generally rectangular or trapezoidal pattern and wherein the shells/shell recesses are disposed immediately adjacent each other, i.e., without other shells/shell recesses disposed therebetween. It is understood that the shells/shell recesses are, in an exemplary embodiment, offset from each other. That is, as used herein with respect to shells/shell recesses, "offset" means a line extending generally perpendicular to the longitudinal axis of a transfer belt does not cross the center of more than one shell/recess.

Figure 2:
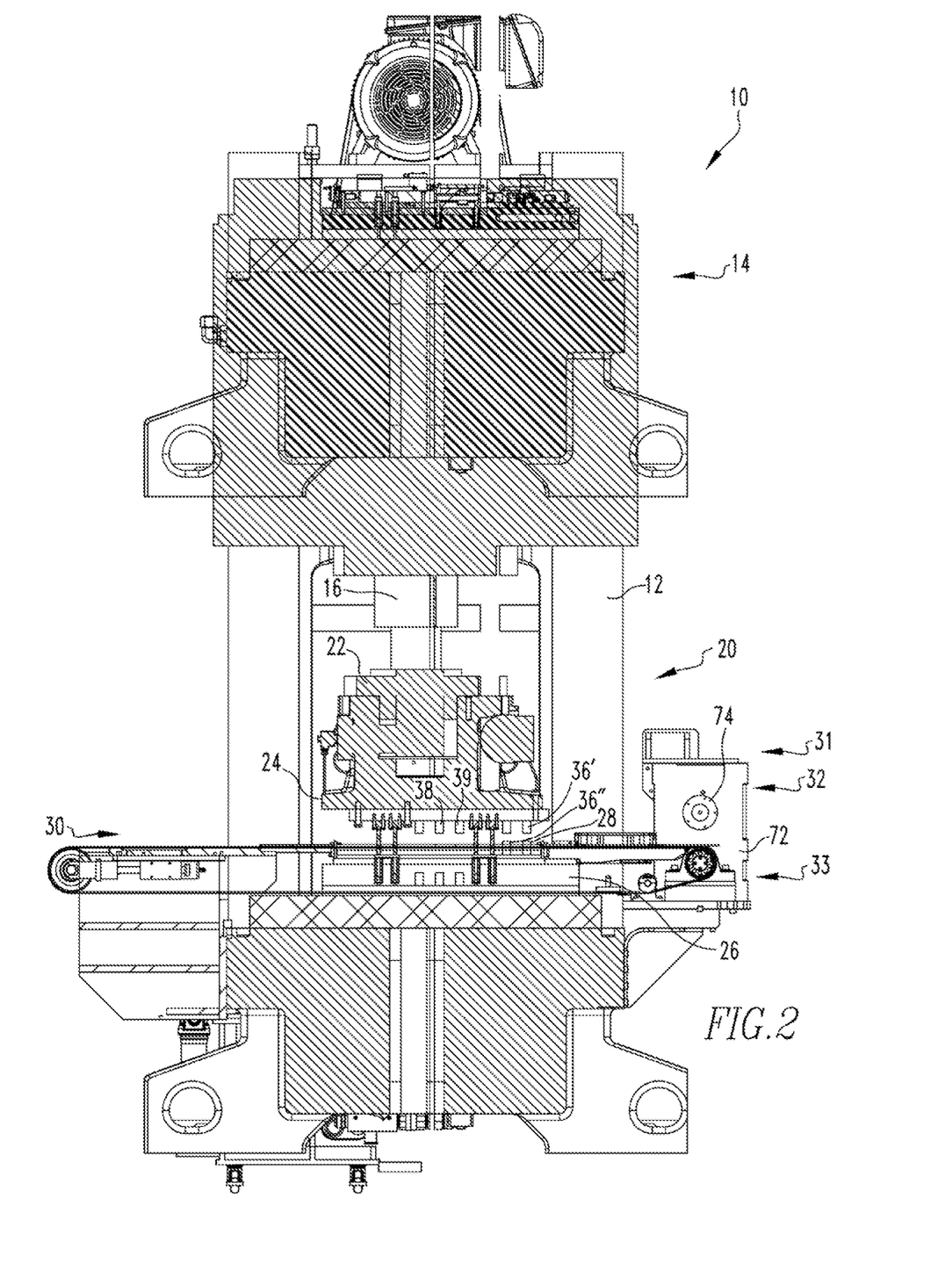
FIG. 2 is a schematic cross-sectional side view of a conversion press.
Figure 3A:
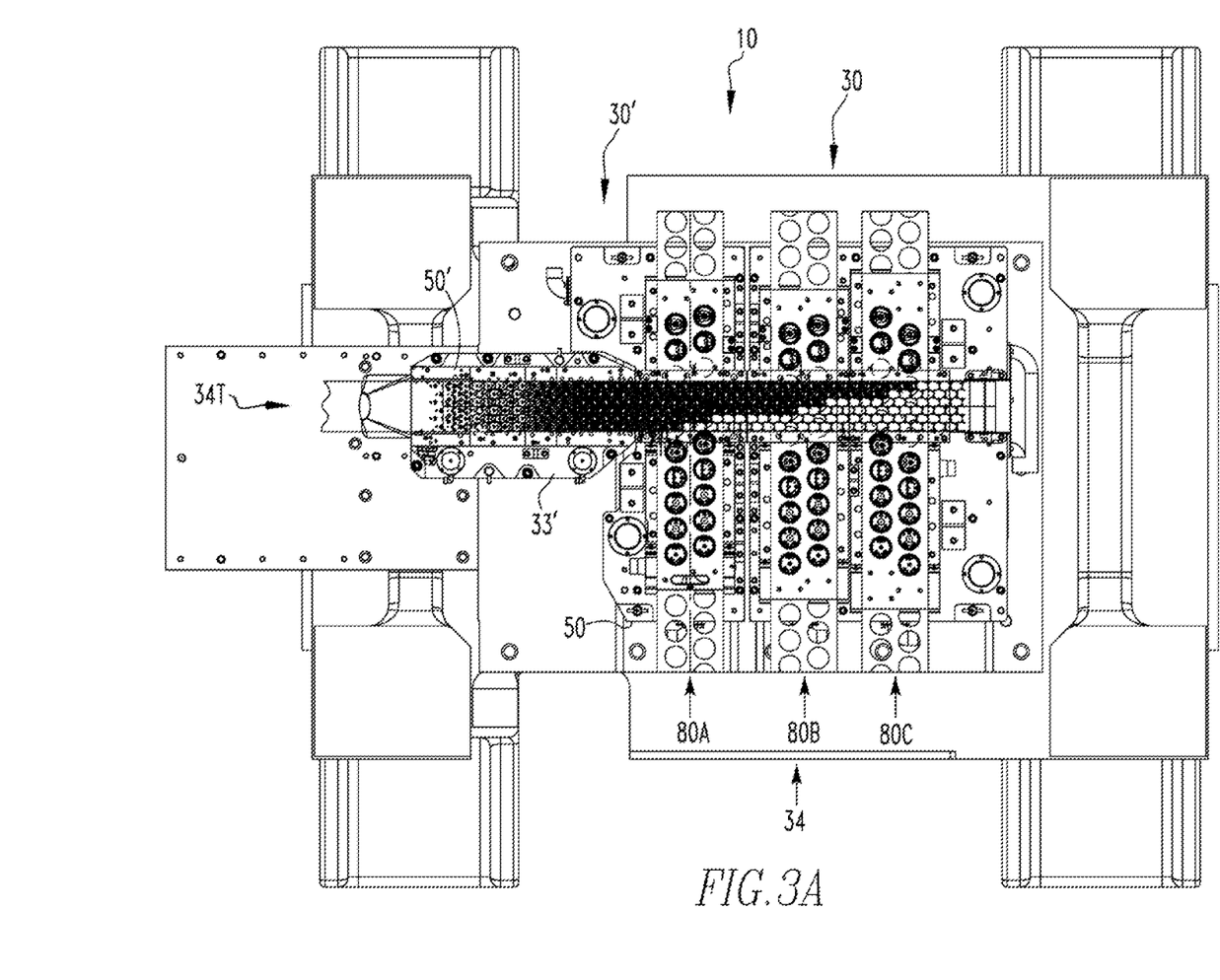
FIG. 3A is a top view of a conversion press with the upper tooling assembly removed for clarity.
Figure 3B:
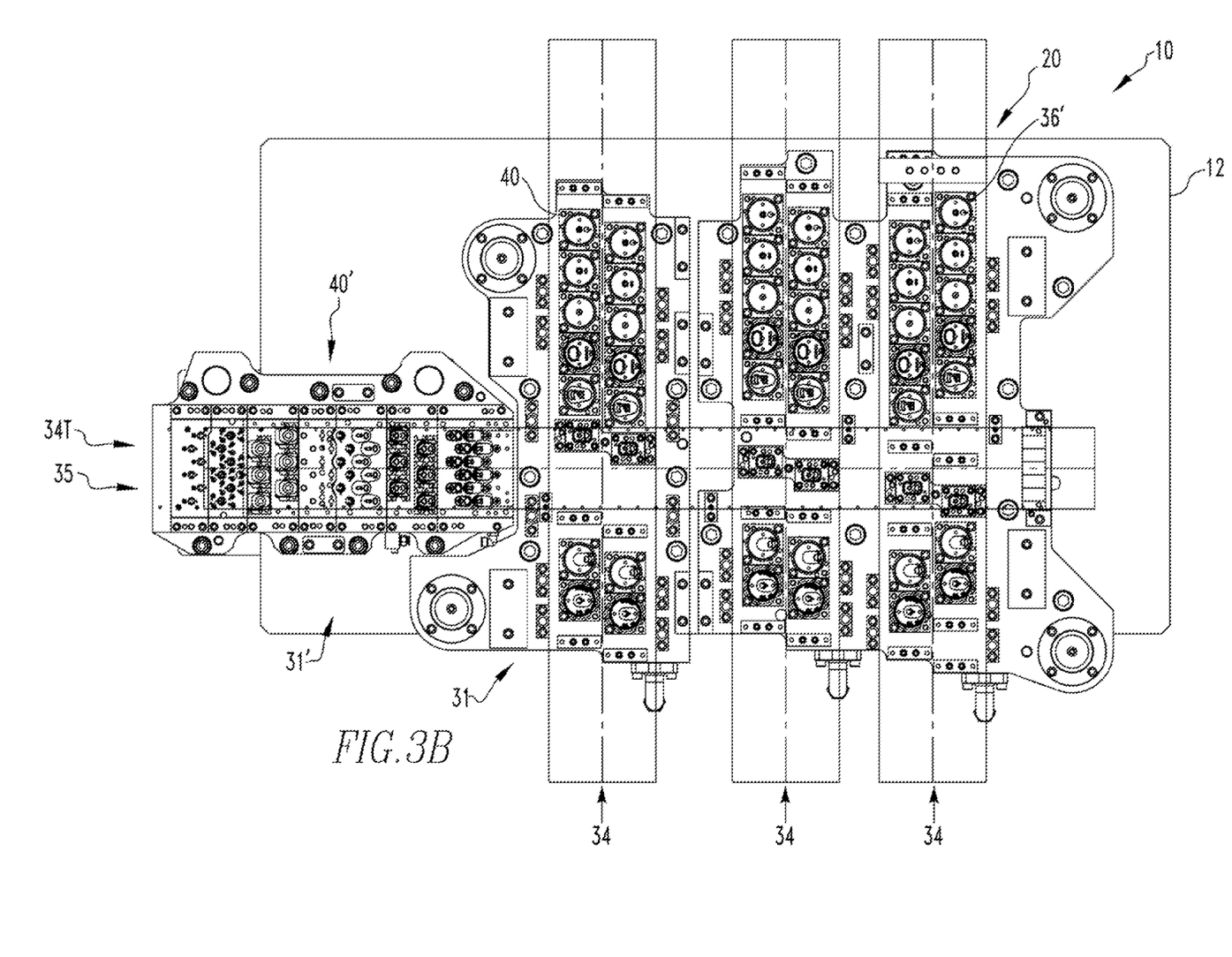
FIG. 3B is a bottom view of a conversion press upper tooling assembly.
Figure 4:
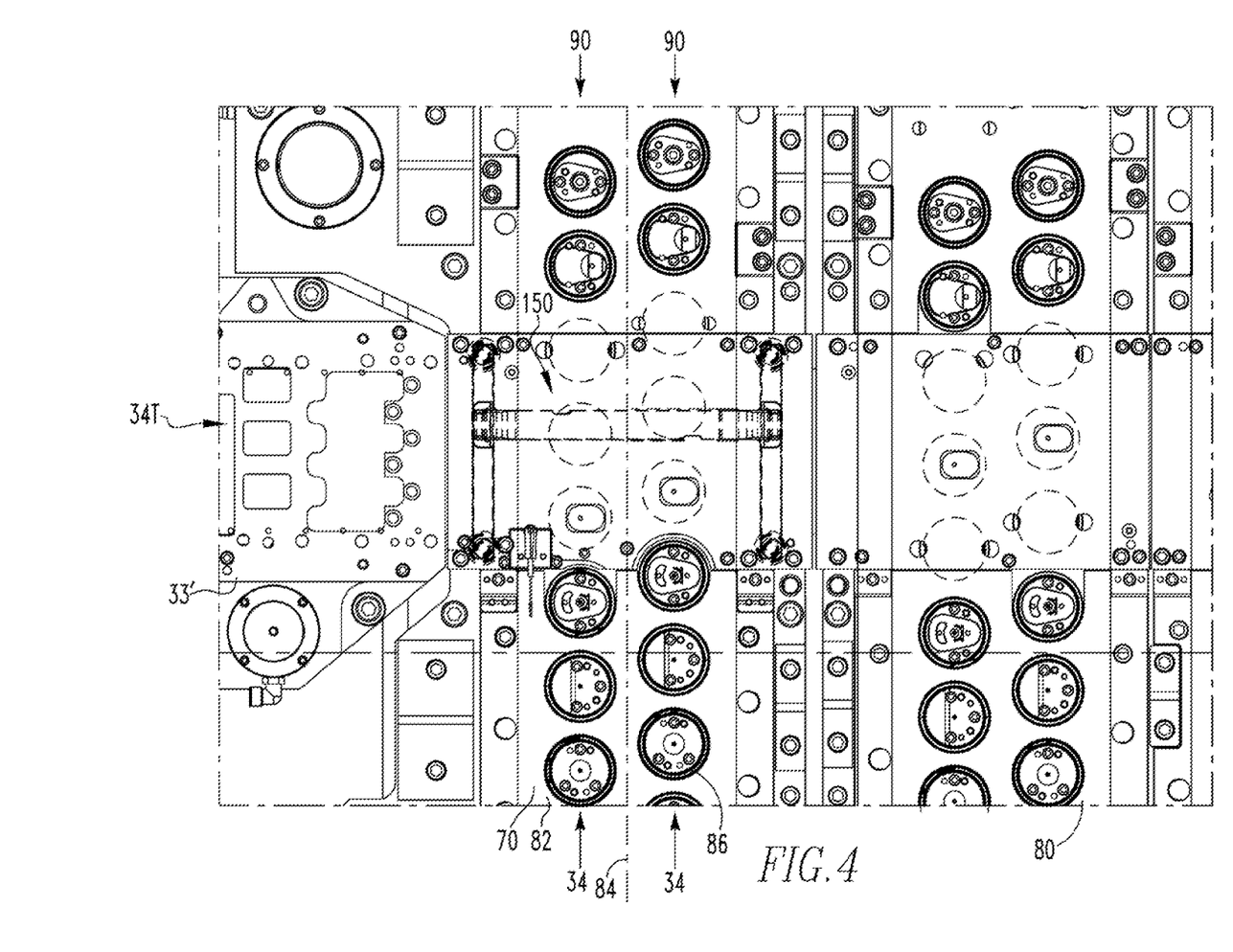
FIG. 4 is a detail top cross-sectional view of a conversion press.

As shown in FIGS. 2-4, a conversion press 10, and in an exemplary embodiment, a beverage can conversion press 10, is structured to form metal blanks 1 and/or a metal sheet (not shown) into can ends 5. The following disclosure uses generally circular blanks 1, which are formed into generally circular can ends 5, as an example. It is understood that this shape is exemplary only and the blanks 1/can ends 5 can be of any shape. In an exemplary embodiment, the blanks 1 are initially cut from a sheet of metal such as, but not limited to aluminum, steel, or alloys of aluminum and/or steel. Further, in the exemplary embodiment, the blanks 1 are formed, or partially formed into "shells" 3. As is known, and as used herein, a "shell" means a blank that has certain formations such as, but not limited to, a center panel and a countersink, but which does not include a tab 4. In the embodiment shown, shells 3 are provided to the conversion press 10. In another embodiment, not shown, the conversion press 10 cuts blanks 1 from a metal sheet and forms the blanks into shells 3. As used herein, when a shell 3 has a tab 4 coupled thereto, the shell 3 becomes a "can end" 5.

The conversion press 10 includes a housing/frame assembly 12 (hereinafter, "housing assembly" 12), a ram press 14 (FIG. 2), a tooling set 20, and a transfer belt assembly 70. The housing assembly 12 is structured to, and does, support the other elements of the conversion press 10. Generally, the specific details of the ram press 14 are not relevant to this disclosure other than to note that the ram press 14 includes an elongated ram body 16 (FIG. 2), that is structured to move in a reciprocal motion and to apply a force sufficient to form metal at a plurality of forming stations, as described below. As is known, the ram press 14 applies the force through the ram body 16. Thus, the ram body 16 is structured to, and does, apply a force along a line of action substantially aligned with the longitudinal axis of the ram body 16. Further, the ram body 16 is structured to be, and is, coupled (indirectly in an exemplary embodiment) to a number of tooling assemblies 30 and, in an exemplary embodiment, an upper die assembly 40, as described below. In the exemplary configuration, the ram body 16 is disposed generally above the tooling assemblies 30 and moves the upper die assemblies 40 downwardly into a second position, as described below.

That is, the nomenclature as used herein is as follows: the "tooling set 20" includes a number of upper die shoes 24, a number of lower die shoes 28, and a number of "tooling assemblies 30." That is, the "tool set" means, essentially, all the elements that are, or can be, swapped out on the ram press 14 when the conversion press 10 is configured to form a different type of can end 5. Each "tooling assembly 30" includes an "upper tooling assembly 31" and a "lower tooling assembly 33." Each upper/lower die assembly 40, 50 includes the upper/lower dies in a "die set" 32. In the embodiment disclosed herein, each "upper tooling assembly 31" is movably coupled to the housing assembly 12 and operatively engaged by the ram press 14 and is structured to move between a first position, wherein the "upper tooling assembly 31," and elements coupled thereto, are spaced from an associated "lower tooling assembly 33" and elements coupled thereto, and, a second position, wherein the "upper tooling assembly 31," and elements coupled thereto, are disposed a forming distance from the associated "lower tooling assembly 33" and elements coupled thereto. Further, each "upper tooling assembly 31" includes one of the upper die shoes 24 and an upper die assembly 40. Similarly, each "lower tooling assembly 33" includes one of the lower die shoes 28 and a lower die assembly 50. That is, as used herein, the upper die shoes 24 and the lower die shoes 28 are identified collectively as part of the tooling set 20 and individually as part of an upper tooling assembly 31/lower tooling assembly 33. Further, each upper die assembly 40 has an associated lower die assembly 50, i.e., the upper and lower die assemblies that are disposed in opposition to each other are associated and are also identified collectively herein as a "die set 32," as discussed below.

In an exemplary embodiment, the tooling set upper mounting 22 is coupled, directly coupled, or fixed to the ram press 14/the ram body 16 and moves therewith. Stated alternately, the ram body 16 operatively engages the upper die assembly 40. The tooling set lower mounting 26 is coupled, directly coupled, or fixed to the housing assembly 12 and is substantially stationary. Each upper die shoe 24 is coupled, directly coupled, or fixed to the tooling set upper mounting 22 and moves therewith. Each lower die shoe 28 is coupled, directly coupled, or fixed to the tooling set lower mounting 26 and is substantially stationary. Each upper die assembly 40 is coupled, directly coupled, or fixed to an upper die shoe 24 and moves therewith. Each lower die assembly 50 is coupled, directly coupled, or fixed to a lower die shoe 28 and is substantially stationary. Thus, the tooling set 20, the tooling assemblies 30, and the die sets 32 (discussed below), are structured to, and do, form the blanks 1/shells 3. In this configuration, the upper die assembly 40 is structured to, and does, move between a first position, wherein the upper die assembly 40 is spaced from an associated lower die assembly 50, and, a second position, wherein the upper die assembly 40 is disposed a forming distance from the associated lower die assembly 50. It is understood that when the upper die assembly 40 is in the second position, the pairs of opposed dies 36', 36" are spaced by a forming distance and that a blank 1 therebetween has a forming operation performed thereon.

The tooling set 20 includes a plurality of shell die sets 32 and a tab die set 35. Each tooling assembly 30 structured to form shells 3 includes a number of shell die sets 32 wherein each shell die set 32 defines at least one elongated shell lane 34. As used herein, a "shell lane" 34 means a series of dies 36', 36" (discussed below) disposed in series and through which a blank 1/shell 3 passes and is formed. The tooling set 20 also includes one tooling assembly 30 that is structured to, and does, form tabs. This is the tab tooling assembly 30' and includes a tab upper tooling assembly 31' and a tab lower tooling assembly 33', and a tab die set 35. The tab die set 35 includes a tab upper die assembly 40' and lower tab die assembly 50'. The tab dies set defines an elongated tab lane 34T.

Further to the definition set forth above, as used herein, a "die set" 32 includes a plurality of pairs of opposed dies 36', 36", i.e., an upper die 36' and a lower die 36", wherein each pair of dies 36', 36" defines a forming station 38. In an exemplary embodiment, the plurality of pairs of opposed dies 36', 36" are disposed in series and in a substantially straight line.

Further, each forming station 38 performs a number of forming operations on blank 1/shell 3. In an exemplary embodiment, each forming station 38 performs a single forming operation on blank 1/shell 3. Further, one forming station 38 is structured to, and does, stake a tab 4 to each shell 3. Hereinafter, this station is identified as the "staking station 38." Further, adjacent each staking station 38 is an idle station 39 wherein no forming activity occurs to the shell 3, tab 4 or can end 5. The idle station(s) 39 are located upstream, downstream or both relative to a staking station 38.

As noted above, each tooling assembly 30 includes an upper tooling assembly 31 and a lower tooling assembly 33. Each upper tooling assembly 31 includes one of the upper die shoes 24 and an upper die assembly 40, 40'. Each lower tooling assembly 33 includes one of the lower die shoes 28 and a lower die assembly 50, 50'. As is known, each upper die assembly 40 is coupled, directly coupled, fixed, or temporarily coupled to an upper die shoe 24, and, each lower die assembly 50 is coupled, directly coupled, fixed or temporarily coupled to a lower die shoe 28. Further, the dies 36', 36" are coupled, directly coupled, fixed, or temporarily coupled to an upper die shoe 24/a lower die shoe 28, respectively.

The transfer belt assembly 70 is structured to, and does, move a plurality of blanks 1/shells 3 through the tooling set 20/the tooling assemblies 30. That is, the transfer belt assembly 70 is structured to, and does, move a plurality of shells between each upper tooling assembly 31 and a lower tooling assembly 33. The transfer belt assembly 70 includes an indexing drive assembly 72 and a number of transfer belts 80. The indexing drive assembly 72 includes an output shaft 74 that is operatively coupled to each transfer belt 80. In an exemplary embodiment, all transfer belts 80 are driven by a single indexing drive assembly 72. As noted above, an "indexing" motion means that indexing drive assembly 72 rotates the output shaft 74, and therefore moves the transfer belts 80, a predetermined/set distance during each cycle of the ram press 14/tooling assembly 30. That is, generally, the indexing drive assembly 72 rotates the output shaft 74 and the transfer belts 80 move. In an exemplary embodiment, the operation of the indexing drive assembly 72 and the motion of the transfer belts 80 is limited to the time when the upper die assembly 40 is moving from the second position to the first position. That is, the transfer belts 80 move as the upper die assembly 40 is moving away from the lower tooling assembly 50. In another exemplary embodiment, operation of the indexing drive assembly 72 and the motion of the transfer belts 80 occurs during the initial motion of the upper die assembly 40 from the first position toward the second position. In all embodiments, the operation of the indexing drive assembly 72 and the motion of the transfer belts 80 stops before, and during, the time the upper die assembly 40 is in the second position. Thus, the blanks 1/shells 3 are not moving during forming operations.

In an exemplary embodiment, there are three transfer belts 80; a lateral, first transfer belt 80A, a central, second transfer belt 80B and a lateral, third transfer belt 80C, as discussed below. The transfer belts 80 are substantially similar and a generic transfer belt 80 is described immediately below. The transfer belt 80 includes an elongated body 82 with ends (not numbered) that are coupled, directly coupled, or fixed to each other so that the transfer belt body 82 forms an elongated loop. That is, the transfer belt body 82, even when formed into a loop, has a centerline or longitudinal axis 84 (hereinafter "longitudinal axis" 84). In an exemplary embodiment, each transfer belt 80, i.e., each transfer belt body 82, is made from a resilient material such as, but not limited to, neoprene rubber. The transfer belt body 82 includes a plurality of recesses 86. Each transfer belt body recess is sized and shaped to correspond to the blanks 1/shells 3 and, hereinafter, the blanks 1/shells 3 are considered to be the same size. That is, one shell 3/blank 1 fits within each recess 86. The recesses 86 are disposed in a number columns 90 that extends generally parallel to the transfer belt body longitudinal axis 84. Hereinafter, and as used herein, the collective term "column[s] of recesses 90" means the "column" and the proper reference number to follow the term "recess" is "90" rather than "86." That is, reference number "86" identifies an individual recess 86 whereas reference number "90" identifies a column of recesses 90. In an exemplary embodiment, each transfer belt 80 includes a limited number of columns of recesses 90. That is, each transfer belt 80 includes two columns of generally adjacent pairs of recesses 90 with each column of recesses 90 disposed on opposed sides of the transfer belt body longitudinal axis 84. As shown in the figures, and in an exemplary embodiment, the recesses 90 in the two columns are longitudinally offset from each other. As used herein, a pair of recesses 90 in this configuration is identified as "an offset adjacent pair of transfer belt assembly transfer belt recesses" 90.

As is known, a strip of material, such as, but not limited to an aluminum sheet, passes through the tab die set 35 wherein the tab die set forms rows of tabs 4 therein. The strip of material has substantially the same width as the tab die lane 34T and hereinafter the width of the tab die lane 34T and the width of tab strip 6 are considered the same. The longitudinal axis of the strip of material, i.e., the tab strip 6, extends, and moves, generally perpendicular to each transfer belt body longitudinal axis 84. Further, in an exemplary embodiment, the tab strip 6 is disposed over/above each transfer belt body 82. In this configuration, the tab strip 6 creates a "crossover," as defined above. In a six-out conversion press 10, the area of each crossover is larger than a 2×2 cluster of shells 3/recesses 86.

In this configuration, and at the time a tab 4 is staked to a shell 3, at least two shells 3 (other than the shells being staked) on each transfer belt 80 will be under the tab strip 6 at the crossover. As noted above, in this configuration, no retaining pin, or similar construct, that extends downwardly from an upper tooling assembly 31 is able to engage a shell 3 at an idle station 39 adjacent a staking station 38.

Figure 5:
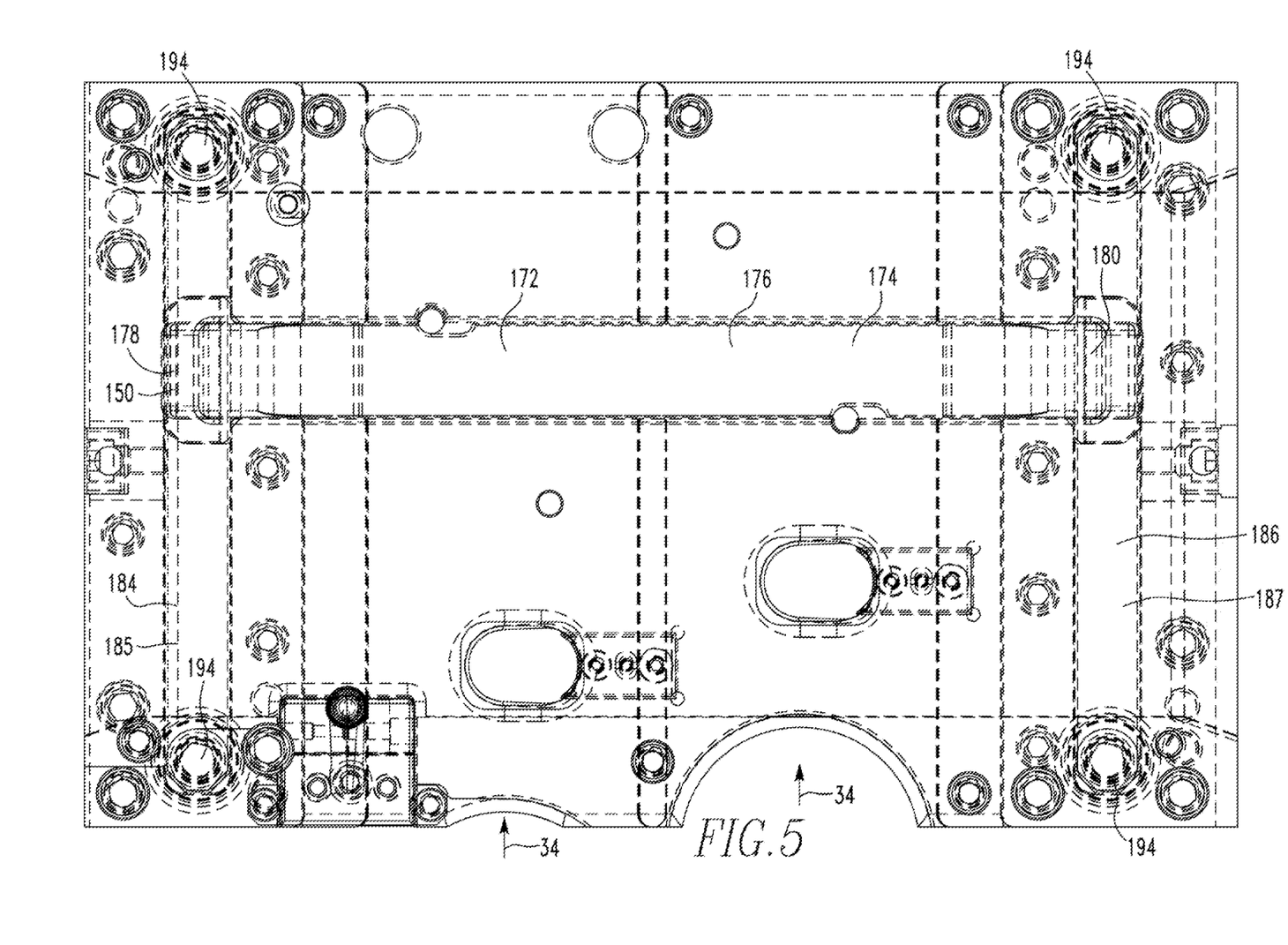
FIG. 5 is a top view of a retainer assembly with selected elements removed for clarity.
Figure 6:
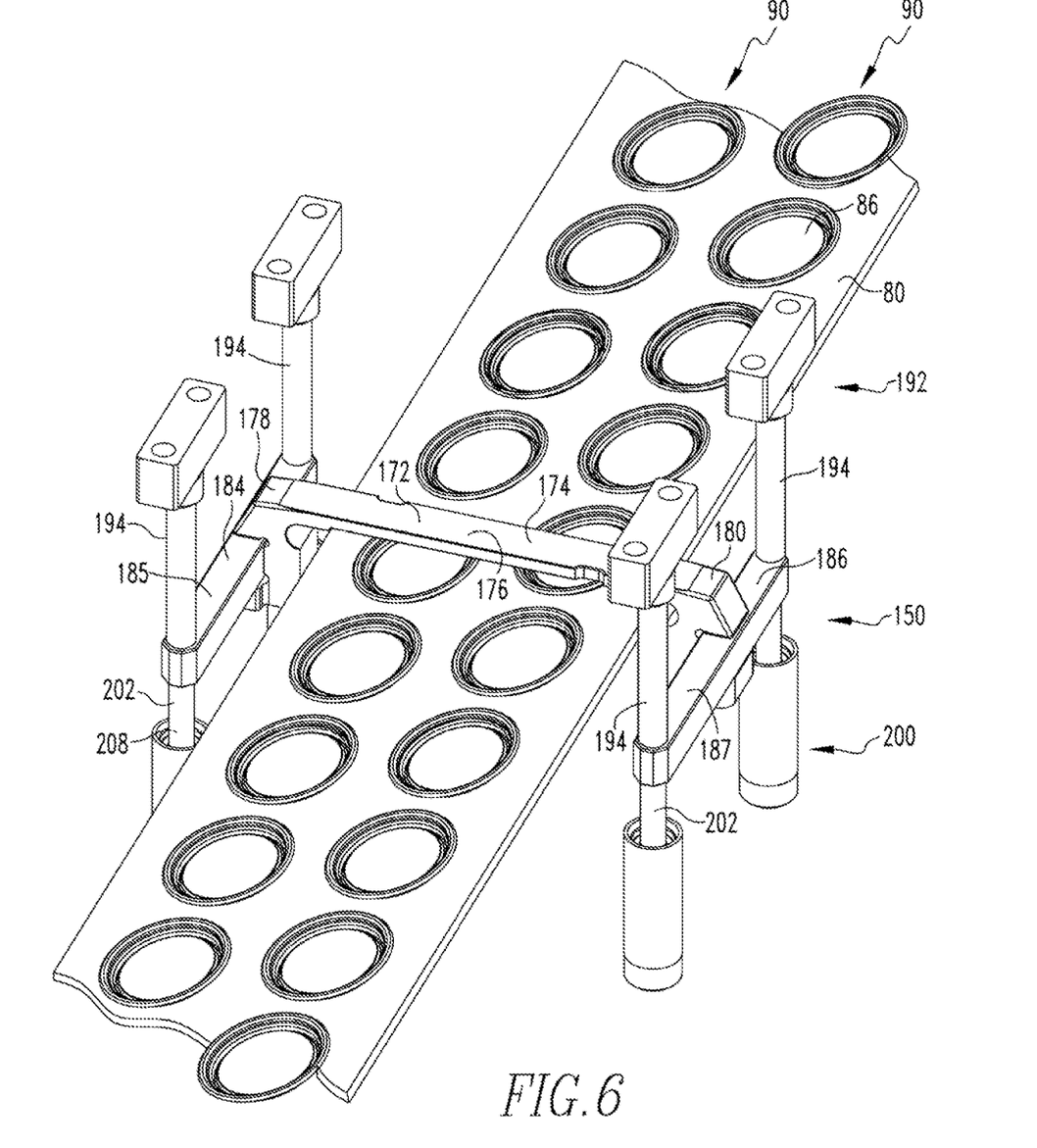
FIG. 6 is an isometric view of a retainer assembly adjacent a transfer belt with other elements removed for clarity.
Figure 7:
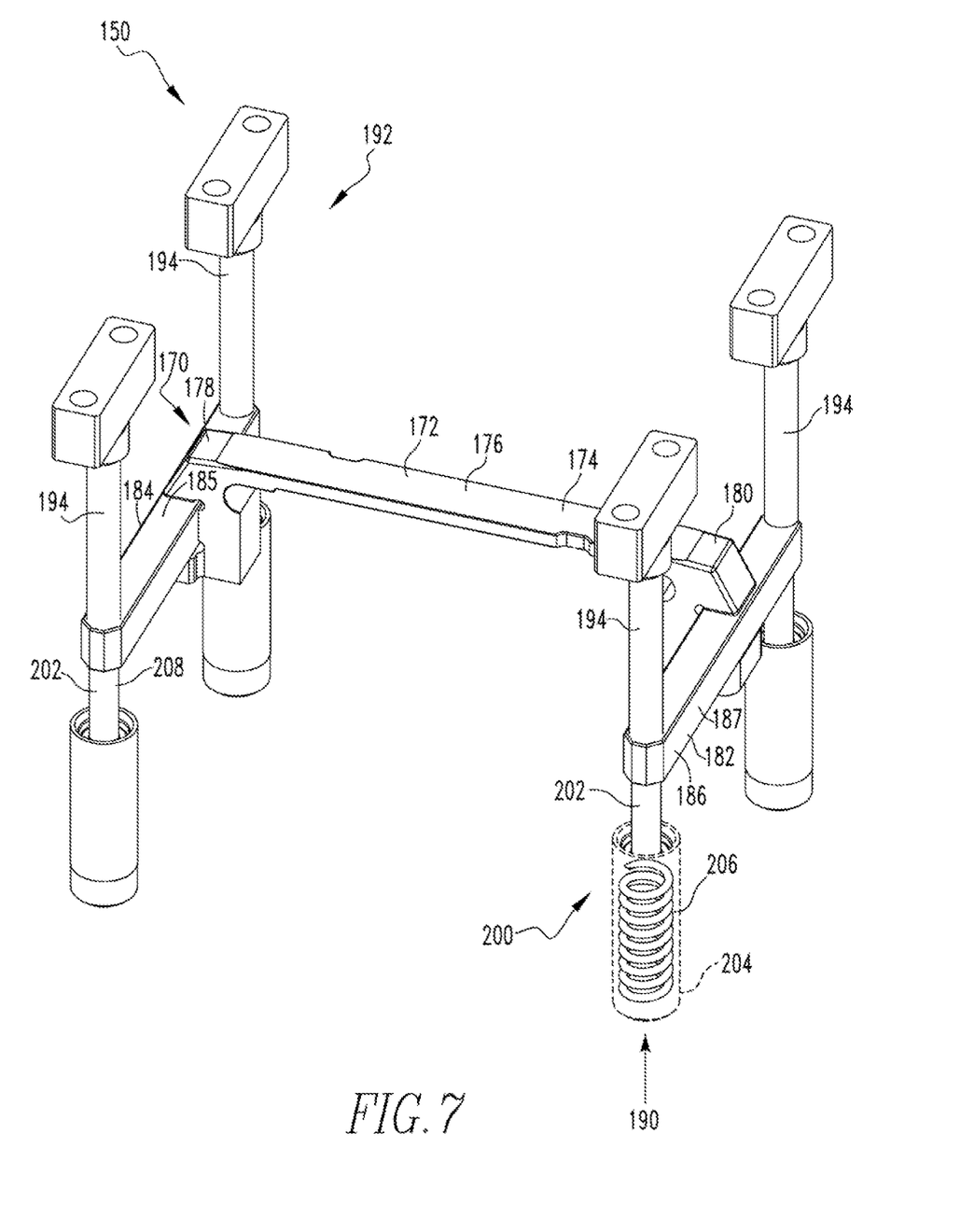
FIG. 7 is an isometric view of a retainer assembly.

As shown in FIGS. 5-7, a retainer assembly 150 is structured to, and does, selectively retain at least one shell 3 in a transfer belt recess 86 at an idle station 39 adjacent a staking station 38. The retainer assembly 150 includes a retaining member assembly 170 and a motion assembly 190. The retaining member assembly 170 is structured to, and does, selectively retain at least one shell 3 in a transfer belt recess 86. In an exemplary embodiment, as shown, the retaining member assembly 170, and therefore the retainer assembly 150, is structured to retain one, or in another embodiment, two, shell(s) 3 each in a transfer belt recess 86. That is, there is one shell 3 retained in each transfer belt recess 86 and the retaining member assembly 170 retains each shell 3 in an associated transfer belt recess 86. The motion assembly 190 is structured to, and does, move a retaining member 172, discussed below, between a first position, wherein the retaining member 172 is spaced from a transfer belt assembly transfer belt 80, and, a second position, wherein the retaining member 172 is disposed a retaining distance from a transfer belt assembly transfer belt 80. As used herein, a "retaining distance" means a distance sufficiently small so that a shell 3 or can end 5 disposed in a transfer belt recess 86 would contact the retaining member 172 if the shell 3 or can end 5 were to move out of, or become askew relative to, the transfer belt recess 86.

The retaining member assembly 170 includes a retaining member 172 and a leveling assembly 182. In embodiments not shown, the retaining member 172 includes, but is not limited to, a resilient member, a number of fingers, a net-like construct, or a tension member. In the embodiment shown, the retaining member 172 is an elongated idle bar 174. The idle bar 174 has a body 176 with a length sufficient to extend perpendicularly, i.e., laterally, across at last one transfer belt 80. The idle bar body 176 has a first end 178 and a second end 180. The idle bar body 176 is coupled, directly coupled, or fixed to the leveling assembly 182. The idle bar 174, and/or the idle bar body 176, is structured to, and does, move between an upper, first position, wherein the idle bar 174 is spaced from a transfer belt assembly transfer belt 80, and, a second position, wherein the idle bar 174 is disposed a retaining distance from a transfer belt assembly transfer belt 80. Further, idle bar 174 is structured to, and does, extend generally perpendicularly across at least one transfer belt assembly transfer belt 80. In an exemplary embodiment, the idle bar 174 is structured to, and does, extend across an adjacent pair of transfer belt assembly transfer belt recesses 90. Further, in another exemplary embodiment, the idle bar 174 is structured to, and does, extend across an offset adjacent pair of transfer belt assembly transfer belt recesses 90.

The leveling assembly 182 is structured to, and does, level the retaining member 172. That is, the leveling assembly 182 is structured to, and does, maintain the idle bar body 176 in a generally horizontal orientation, i.e., the longitudinal axis of the idle bar body 176 remains generally horizontal. The leveling assembly 182 includes a first elongated member 184 and a second elongated member 186. The leveling assembly first and second members 184, 186 move with the retaining member 172. Thus, the leveling assembly first and second members 184, 186 move between an upper, first position and a lower, second position.

The leveling assembly first member 184 includes an elongated body 185 that is structured to be, and is, disposed adjacent to, and generally parallel to the longitudinal axis of, a transfer belt assembly transfer belt 80. Similarly, the leveling assembly second member 186 includes an elongated body 187 structured to be disposed adjacent to, and generally parallel to the longitudinal axis of, a transfer belt assembly transfer belt 80. The leveling assembly first elongated member 184 and the leveling assembly second elongated member 186 are disposed on opposite sides of the transfer belt assembly transfer belt 80. The idle bar first end 178 is coupled, directly coupled, or fixed to the leveling assembly first elongated member 184. The idle bar second end 180 is coupled, directly coupled, or fixed to the leveling assembly second elongated member 186. The leveling assembly first elongated member 184 is coupled, directly coupled, or fixed to at least one motion assembly lower assembly member 202 (discussed below). Similarly, the leveling assembly second elongated member 186 is also coupled, directly coupled, or fixed to at least one motion assembly lower assembly member 202.

The motion assembly 190, in an exemplary embodiment, includes an upper assembly 192 and a lower assembly 200. The motion assembly upper assembly 192 is structured to be, and is, coupled to and moves with the upper tooling assembly 31. As shown, the motion assembly upper assembly 192 includes a number of elongated members 194 that are structured to, and do, downwardly depend from the upper tooling assembly 31. That is, the motion assembly upper assembly members 194 are coupled, directly coupled, or fixed to the upper tooling assembly 31. The motion assembly upper assembly members 194 are disposed so that, as the upper tooling assembly 31 moves from the first position to the second position, the motion assembly upper assembly members 194 operatively engage the motion assembly lower assembly 200 and/or an associated leveling member 184, 186.

The motion assembly lower assembly 200 is structured to be, and is, movably coupled to the lower tooling assembly 33. It is understood that, as used herein, when elements of an assembly are movably coupled to another element, it is said that the assembly is movably coupled to another element. The motion assembly lower assembly 200 is structured to, and does, move between an upper first configuration and a lower second configuration. In the first configuration, the motion assembly lower assembly 200 is structured to, and does, position the leveling assembly first elongated member 184 and the leveling assembly second elongated member 186 in the first position. In the second configuration, the motion assembly lower assembly 200 is structured to, and does, position the leveling assembly first elongated member 184 and the leveling assembly second elongated member 186 in the second position.

In an exemplary embodiment, the motion assembly lower assembly 200 includes a number of elongated members 202 and a number of biasing devices 204. As shown, the motion assembly lower assembly biasing devices 204 are springs 206. The motion assembly lower assembly biasing devices 204 are disposed in pockets (not numbered) in the lower tooling assembly 33. That is, the motion assembly lower assembly biasing devices 204 are coupled, directly coupled, or fixed to the lower tooling assembly 33. The motion assembly lower assembly members 202 are structured to be engaged by an associated motion assembly lower assembly biasing device 204. The motion assembly lower assembly members 202 are, in an exemplary embodiment, elongated rods 208 having a flange (not shown) or other spring mounting. The motion assembly lower assembly members 202 also move between an upper, first position and a lower second position.

That is, the motion assembly lower assembly biasing devices 204 are disposed in the pockets. The motion assembly lower assembly members 202 are movably disposed in the pocket with the motion assembly lower assembly biasing devices 204 between the motion assembly lower assembly members 202 and the pockets. In this configuration, the motion assembly lower assembly biasing devices 204 operatively engage and bias the motion assembly lower assembly members 202 to the first position. The motion assembly lower assembly members 202 are coupled, directly coupled, or fixed to the leveling assembly first and second members 184, 186. That is, as shown, there are four motion assembly lower assembly members 202 with two coupled to each of the leveling assembly first and second members 184, 186. Thus, the leveling assembly first and second members 184, 186 move with the motion assembly lower assembly members 202 and are biased to their first position. Further the retaining member 172, and as shown the idle bar 174, is coupled, directly coupled, or fixed to the leveling assembly first and second members 184, 186. Thus, the retaining member 172 is also biased to its first position.

In operation, the motion assembly upper assembly members 194 are aligned with the motion assembly lower assembly members 202 and/or the leveling assembly first and second members 184, 186. In this configuration, and as the upper tooling assembly 31 moves from the first position to the second position, the motion assembly upper assembly members 194 operatively engage the motion assembly lower assembly members 202 and/or the leveling assembly first and second members 184, 186, causing the motion assembly lower assembly 200 to move from the first configuration to the second configuration. As the upper tooling assembly 31 moves from the second position to the first position, the bias of the motion assembly lower assembly biasing devices 204 bias, and move, the motion assembly lower assembly members 202 and/or the leveling assembly first and second members 184, 186 to their first positon. Thus, the retaining member 172 cycles between the first and second positions as the upper tooling assembly 31 cycles between its first and second positions.

While specific embodiments of the invention have been described in detail, it will be appreciated by those skilled in the at that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof. It is, however, noted that the term "tab lane having a width greater than the length of a 2×2 cluster of shell recesses" in the preamble of Claim 1 is necessary to give life, meaning, and vitality to the claim in that this configuration of elements prevents the use of a retaining pin to maintain the shells 3 in position on the transfer belts 80. That is, while this element is not part of the retainer assembly 170, it is this configuration that makes the retainer assembly 170 necessary.

What is claimed is:

1. A retainer assembly for a conversion press, said conversion press including a transfer belt assembly structured to move a number of shells, said transfer belt assembly including a number of transfer belts each defining a number of recesses, each recess corresponding to a shell, said retainer assembly comprising:
    a retaining member assembly including an elongated idler bar structured to extend perpendicularly across at least one transfer belt and to selectively retain at least one shell in a transfer belt assembly belt recess.

2. The retainer assembly of claim 1 further comprising a motion assembly structured to move said elongated idler bar between a first position corresponding to said elongated idler bar being spaced from said transfer belt, and a second position corresponding to said elongated idler bar being disposed a retaining distance from said transfer belt.

3. The retainer assembly of claim 1 wherein said transfer belt recesses are disposed in generally adjacent pairs and wherein:
    said elongated idle bar is structured to extend across an adjacent pair of transfer belt assembly transfer belt recesses.

4. The retainer assembly of claim 2 wherein:
    said motion assembly includes an upper assembly and a lower assembly;
    said motion assembly lower assembly structured to move between an upper first configuration and a lower second configuration;
    said elongated idler bar is coupled to said motion assembly lower assembly;
    wherein said motion assembly upper assembly is structured to move between an upper first position and a lower second position; and
    wherein said motion assembly upper assembly is structured to engage said motion assembly lower assembly and move said motion assembly lower assembly between said motion assembly lower assembly first configuration and said motion assembly lower assembly second configuration.

5. The retainer assembly of claim 4 wherein:
    said motion assembly upper assembly includes a number of elongated members;
    said motion assembly lower assembly includes a number of elongated members and a number of biasing devices;
    each said elongated member structured to be engaged by an associated biasing device; and
    wherein each biasing device is operatively coupled to an associated elongated member and biases said associated elongated member to the first position.

6. The retainer assembly of claim 5 wherein said retaining member assembly includes a leveling assembly structured to level said elongated idler bar.

7. The retainer assembly of claim 6 wherein:
    said elongated idle bar having a first end and a second end;
    said leveling assembly includes a first elongated member and a second elongated member;
    said first elongated member structured to be disposed adjacent to, and generally parallel to the longitudinal axis of, a transfer belt;
    said second elongated member structured to be disposed adjacent to, and generally parallel to the longitudinal axis of, said transfer belt;
    the first end of said elongated idle bar coupled to said first elongated member;
    the second end of said elongated idle bar coupled to said second elongated member;
    said first elongated member coupled to at least one motion assembly lower assembly member; and
    said second elongated member coupled to at least one motion assembly lower assembly member.

8. The retainer assembly of claim 7 wherein each said biasing device is a spring.

9. The retainer assembly of claim 7 wherein each said upper assembly member operatively engages an associated leveling assembly member.

10. A conversion press comprising:
    a transfer belt assembly including a number of transfer belts;
    a retainer assembly;
    said transfer belt assembly structured to move a number of shells, each transfer belt defining a number of recesses, each recess corresponding to a shell; and
    said retaining member assembly including an elongated idler bar structured to extend perpendicularly across at least one transfer belt and to selectively retain at least one shell in a transfer belt assembly belt recess.

11. The conversion press of claim 10 wherein said retainer assembly further comprise a motion assembly structured to move said elongated idler bar between a first position corresponding to said elongated idler bar being spaced from said transfer belt, and a second position corresponding to said elongated idler bar being disposed a retaining distance from said transfer belt.

12. The conversion press of claim 10 wherein said conversion press includes a number of stake stations; and
    said elongated idle bar is disposed immediately adjacent at least one stake station.

13. The conversion press of claim 10 wherein said conversion press includes a number of idle stations; and
said elongated idle bar is disposed immediately adjacent at least one idle station.

14. The conversion press of claim 10 wherein:
said transfer belt recesses are disposed in generally adjacent pairs; and
said elongated idle bar extends across an adjacent pair of transfer belt recesses.

15. The conversion press of claim 11 wherein:
said motion assembly includes an upper assembly and a lower assembly;
said lower assembly structured to move between an upper first configuration and a lower second configuration;
said elongated idler bar is coupled to said lower assembly;
wherein said upper assembly is structured to move between an upper first position and a lower second position; and
wherein said upper assembly is structured to engage said lower assembly and move said lower assembly between said upper first configuration and said lower second configuration.

16. The conversion press of claim 15 wherein:
said upper assembly includes a number of elongated members;
said lower assembly includes a number of elongated members and a number of biasing devices;
each said elongated member structured to be engaged by an associated biasing device; and
wherein each biasing device is operatively coupled to an associated elongated member and biases said associated elongated member to the first position.

17. The conversion press of claim 16 wherein said retaining member assembly includes a leveling assembly structured to level said elongated idler bar.

18. The conversion press of claim 17 wherein:
said elongated idle bar has a first end and a second end;
said leveling assembly includes a first elongated member and a second elongated member;
said first elongated member structured to be disposed adjacent to, and generally parallel to the longitudinal axis of, a transfer belt;
said second elongated member structured to be disposed adjacent to, and generally parallel to the longitudinal axis of, said transfer belt;
the first end of said elongated idle bar being coupled to said first elongated member;
the second end of said elongated idle bar being coupled to said second elongated member;
said first elongated member is coupled to at least one motion assembly lower assembly member; and
said second elongated member is coupled to at least one motion assembly lower assembly member.

19. The conversion press of claim 18 wherein each said biasing device is a spring.

20. The conversion press of claim 18 wherein each said upper assembly member operatively engages an associated leveling assembly member.

* * * * *